(12) United States Patent
Seok

(10) Patent No.: US 11,060,728 B2
(45) Date of Patent: Jul. 13, 2021

(54) COMBUSTOR AND GAS TURBINE INCLUDING THE SAME

(71) Applicant: DOOSAN HEAVY INDUSTRIES & CONSTRUCTION CO., LTD., Changwon-si (KR)

(72) Inventor: Jungmin Seok, Goyang-si (KR)

(*) Notice: Subject to any disclaimer, the term of this patent is extended or adjusted under 35 U.S.C. 154(b) by 207 days.

(21) Appl. No.: 16/180,000

(22) Filed: Nov. 4, 2018

(65) Prior Publication Data

US 2019/0137105 A1    May 9, 2019

(30) Foreign Application Priority Data

Nov. 9, 2017   (KR) .................. 10-2017-0148633

(51) Int. Cl.
   *F23R 3/28*    (2006.01)
   *F23R 3/14*    (2006.01)
   (Continued)

(52) U.S. Cl.
   CPC ............. *F23R 3/286* (2013.01); *F02C 3/30* (2013.01); *F23D 11/383* (2013.01); *F23R 3/14* (2013.01); *F23R 3/36* (2013.01); *F23D 11/10* (2013.01)

(58) Field of Classification Search
   CPC .... F23R 3/14; F23R 3/286; F23R 3/36; F23R 3/343; F23D 11/10; F23D 11/383;
   (Continued)

(56) References Cited

U.S. PATENT DOCUMENTS

| 4,337,618 A | 7/1982 | Hughes et al. |
| 4,342,198 A * | 8/1982 | Willis ................ F23D 17/002 239/400 |

(Continued)

FOREIGN PATENT DOCUMENTS

| CN | 102374533 A | 3/2012 |
| EP | 0071419 A1 | 2/1983 |

(Continued)

OTHER PUBLICATIONS

A Korean Office Action dated Feb. 26, 2019 in connection with Korean Patent Application No. 10-2017-0148633 which corresponds to the above-referenced U.S. application.

(Continued)

*Primary Examiner* — Alain Chau

(57) ABSTRACT

A combustor includes a plurality of fuel nozzles arranged in a nozzle casing. Each fuel nozzle includes a first fuel injection passage disposed at the axial center of the fuel nozzle and configured to inject liquid fuel into a combustion chamber. A second fuel injection passage encloses the first fuel injection passage and injects liquid fuel into the combustion chamber at a predetermined spray angle with respect to a center line of the fuel nozzle. A first air injection passage encloses the second fuel injection passage and injects air to be mixed with the injected liquid fuel from the second fuel injection passage. At the combustion chamber end, opposing surfaces of the first and second fuel injection passages are each inclined with respect to the center line and are separated by a space through which the liquid fuel of the second fuel injection passage is injected.

17 Claims, 14 Drawing Sheets

(51) Int. Cl.
*F23R 3/36* (2006.01)
*F23D 11/38* (2006.01)
*F02C 3/30* (2006.01)
*F23D 11/10* (2006.01)

(58) Field of Classification Search
CPC .......... F23D 17/002; F23C 1/08; F23C 7/004; F23C 2900/07001; F23L 7/002; F23L 7/005; F02C 3/30
See application file for complete search history.

(56) References Cited

U.S. PATENT DOCUMENTS

| | | | | |
|---|---|---|---|---|
| 5,259,184 | A * | 11/1993 | Borkowicz | F23D 14/00 60/39.55 |
| 5,408,830 | A * | 4/1995 | Lovett | F23D 17/002 239/422 |
| 6,378,787 | B1 * | 4/2002 | Buchi | F23D 11/26 239/406 |
| 6,397,602 | B2 * | 6/2002 | Vandervort | F23R 3/14 60/737 |
| 6,598,383 | B1 * | 7/2003 | Vandervort | F23R 3/14 60/773 |
| 6,609,380 | B2 * | 8/2003 | Mick | F02C 3/22 60/742 |
| 7,007,477 | B2 * | 3/2006 | Widener | F23D 14/78 60/737 |
| 7,104,070 | B2 * | 9/2006 | Iasillo | F02C 3/22 60/740 |
| 7,143,583 | B2 * | 12/2006 | Hayashi | F23R 3/18 60/776 |
| 8,613,197 | B2 | 12/2013 | Uhm | |
| 9,217,570 | B2 | 12/2015 | Parsania et al. | |
| 9,371,989 | B2 * | 6/2016 | Boardman | F23D 11/16 |
| 9,383,107 | B2 * | 7/2016 | Shershnyov | F23R 3/14 |
| 9,534,790 | B2 | 1/2017 | Cai et al. | |
| 10,794,589 | B2 * | 10/2020 | Shershnyov | F23D 11/106 |
| 2001/0004827 | A1 * | 6/2001 | Vandervort | F23R 3/286 60/39.55 |
| 2004/0035114 | A1 * | 2/2004 | Hayashi | F23R 3/343 60/737 |
| 2005/0193741 | A1 * | 9/2005 | Iasillo | F02C 3/30 60/776 |
| 2010/0263382 | A1 | 10/2010 | Mancini et al. | |
| 2012/0117976 | A1 | 5/2012 | Krull et al. | |
| 2012/0291447 | A1 * | 11/2012 | Boardman | F23L 7/005 60/776 |
| 2013/0186094 | A1 * | 7/2013 | Parsania | F23L 7/002 60/772 |
| 2014/0190168 | A1 * | 7/2014 | Shershnyov | F23R 3/36 60/737 |
| 2017/0130962 | A1 | 5/2017 | Inoue et al. | |
| 2017/0176000 | A1 * | 6/2017 | Shershnyov | F23D 11/16 |

FOREIGN PATENT DOCUMENTS

| | | |
|---|---|---|
| EP | 2466206 A2 | 6/2012 |
| EP | 2664767 A1 | 11/2013 |
| JP | H11-159757 A | 6/1999 |
| JP | 2004-138376 A | 5/2004 |
| JP | 2017-521624 A | 8/2017 |
| WO | 2013/056819 A1 | 4/2013 |

OTHER PUBLICATIONS

An European Search Report dated Mar. 14, 2019 in connection with European Patent Application No. 18205067.4 which corresponds to the above-referenced U.S. application.

* cited by examiner

COMBUSTOR AND GAS TURBINE INCLUDING THE SAME

CROSS-REFERENCE TO RELATED APPLICATIONS

This application claims priority to Korean Patent Application No. 10-2017-0148633 filed on Nov. 9, 2017, the disclosure of which is incorporated herein by reference in its entirety.

BACKGROUND OF THE DISCLOSURE

Field of the Disclosure

Exemplary embodiments of the present disclosure relate to a combustor and a gas turbine including the combustor.

Description of the Related Art

A gas turbine is a power engine configured to mix fuel with air compressed by a combustor, combust the mixture, and rotate a turbine using high-temperature gas generated by the combustion. Gas turbines are used to drive a generator, an aircraft, a vessel, a train, and so forth.

Generally, gas turbines include a compressor, a combustor, and a turbine. The compressor draws external air, compresses the air, and then transmits it to the combustor. Air compressed by the compressor enters a high-pressure and high-temperature state. The combustor mixes fuel with compressed air supplied from the compressor, and combusts the mixture. Combustion gas generated by the combustion is discharged to the turbine. Turbine blades provided in the turbine are rotated by the combustion gas, whereby power is generated. Generated power may be used in various fields, e.g., for generating electricity, driving a mechanical device, etc.

SUMMARY OF THE DISCLOSURE

An object of the present disclosure is to provide a combustor capable of dividing liquid fuel injected into combustion chamber into small liquid droplets, and a gas turbine including the combustor.

In accordance with one aspect of the present disclosure, a combustor may include a nozzle casing and a plurality of first fuel nozzles disposed in the nozzle casing and spaced apart from each other along an annular imaginary line, each first fuel nozzle having an axial center at which a first center line is drawn and comprising a first fuel injection passage disposed at the axial center of the first fuel nozzle and configured to inject liquid fuel into a combustion chamber; a second fuel injection passage enclosing the first fuel injection passage, and configured to inject liquid fuel into the combustion chamber at a predetermined spray angle with respect to the first center line; and a first air injection passage enclosing the second fuel injection passage, and configured to inject air to be mixed with the injected liquid fuel from the second fuel injection passage.

The first fuel injection passage may include a first end disposed adjacent to the combustion chamber, the first end having an outer circumferential surface inclined at a predetermined angle with respect to the first center line; and the second fuel injection passage may include a second end disposed adjacent to the combustion chamber, the second end having an inner circumferential surface inclined at the predetermined angle with respect to the first center line. The outer circumferential surface of the first end and the inner circumferential surface of the second end may be opposing surfaces separated by a space through which the liquid fuel of the second fuel injection passage is injected into the combustion chamber.

The outer circumferential surface of the first end may have a truncated conical shape. The inner circumferential surface of the second end may have a shape corresponding to the outer circumferential surface of the first end. The inner circumferential surface of the second end may have a truncated conical shape.

The combustor may further include a first water supply passage communicating with the first air injection passage and configured to supply water to the first air injection passage, and the water and the air may be mixed with each other in the first air injection passage and injected from the first air injection passage. The second fuel injection passage may be enclosed by the first water supply passage and the first air injection passage.

The liquid fuel may be injected into the combustion chamber from either one of the first fuel injection passage and the second fuel injection passage.

Each first fuel nozzle may further include a plurality of first swirlers disposed at positions spaced apart from each other along a circumference of the first air injection passage, and each first swirler may be configured to inject gas fuel into the first air injection passage.

The combustor may further include a plurality of second fuel nozzles disposed along the annular imaginary line, and each second fuel nozzle may be disposed between a pair of adjacent first fuel nozzles of the plurality of first fuel nozzles and having an axial center at which a second center line is drawn. Each of the plurality of second fuel nozzles may include a central shaft disposed at the axial center of the second fuel nozzle; a third fuel injection passage enclosing the central shaft, and configured to inject liquid fuel into the combustion chamber at a predetermined spray angle with respect to the second center line; and a second air injection passage enclosing the third fuel injection passage, and configured to inject air to be mixed with the injected liquid fuel from the third fuel injection passage. The central shaft may include a third end disposed adjacent to the combustion chamber, and the third end having an outer circumferential surface inclined at a predetermined angle with respect to the second center line; and the third fuel injection passage may include a fourth end disposed adjacent to the combustion chamber, the fourth end having an inner circumferential surface inclined at the predetermined angle with respect to the second center line. The outer circumferential surface of the third end and the inner circumferential surface of the fourth end may be opposing surfaces separated by a space through which the liquid fuel of the third fuel injection passage is injected into the combustion chamber. The inner circumferential surface of the fourth end may have a shape corresponding to the outer circumferential surface of the third end. Each of the outer circumferential surface of the third end and the inner circumferential surface of the fourth end may have a truncated conical shape.

The combustor may further include a second water supply passage communicating with the second air injection passage and configured to supply water to the second air injection passage, and the water and the air may be mixed with each other in the second air injection passage and injected from the second air injection passage.

Each second fuel nozzle may further include a plurality of second swirlers disposed at positions spaced apart from each other along a circumference of the second air injection passage, and each second swirler may be configured to inject gas fuel into the second air injection passage.

In accordance with another aspect of the present disclosure, a combustor may include a nozzle casing and a plurality of first fuel nozzles disposed in the nozzle casing and spaced apart from each other along an annular imaginary line, each first fuel nozzle having an axial center at which a first center line is drawn and comprising; a first fuel injection passage disposed at the axial center of the first fuel nozzle and configured to inject liquid fuel into a combustion chamber; a first air injection passage enclosing the second fuel injection passage, and configured to inject air into the combustion chamber; and a first water supply passage communicating with the first air injection passage and configured to supply water to the first air injection passage, the water and the air being mixed with each other in the first air injection passage and injected from the first air injection passage.

In accordance with yet another aspect of the present disclosure, there is provided a gas turbine including a compressor to compress air drawn from an outside, a combustor to produce combustion gas by mixing fuel with the compressed air and combusting a mixture of the fuel and the compressed air, and a turbine configured to be rotated by the combustion gas. The combustor of the gas turbine is consistent with a combustor as described above.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Figure 1:
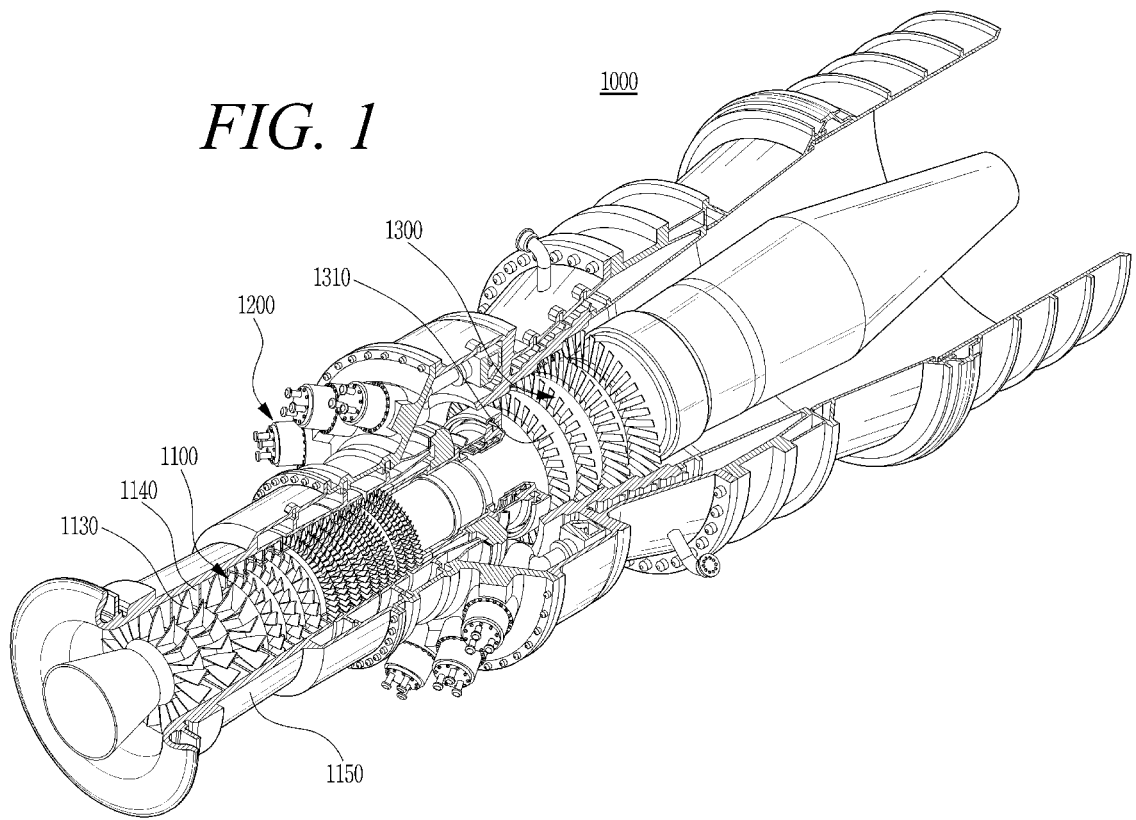
FIG. 1 is a cutaway perspective view of a gas turbine including a combustor in accordance with the present disclosure.

Since the present disclosure may be modified in various forms, and may have various embodiments, preferred embodiments will be illustrated in the accompanying drawings and described in detail with reference to the drawings. However, this is not intended to limit the present disclosure to particular modes of practice, and it is to be appreciated that all changes, equivalents, and substitutes that do not depart from the spirit and technical scope of the present disclosure are encompassed in the present disclosure.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, preferred embodiments of the present disclosure will be described in detail with reference to the accompanying drawings. Reference now should be made to the drawings, in which the same reference numerals are used throughout the different drawings to designate the same or similar components. Details of well-known configurations and functions may be omitted to avoid unnecessarily obscuring the gist of the present disclosure. For the same reason, in the accompanying drawings, elements may be exaggerated, omitted, or depicted schematically.

Hereinafter, a gas turbine in accordance with an embodiment of the present disclosure will be described with reference to FIGS. 1 to 4.

Figure 2:
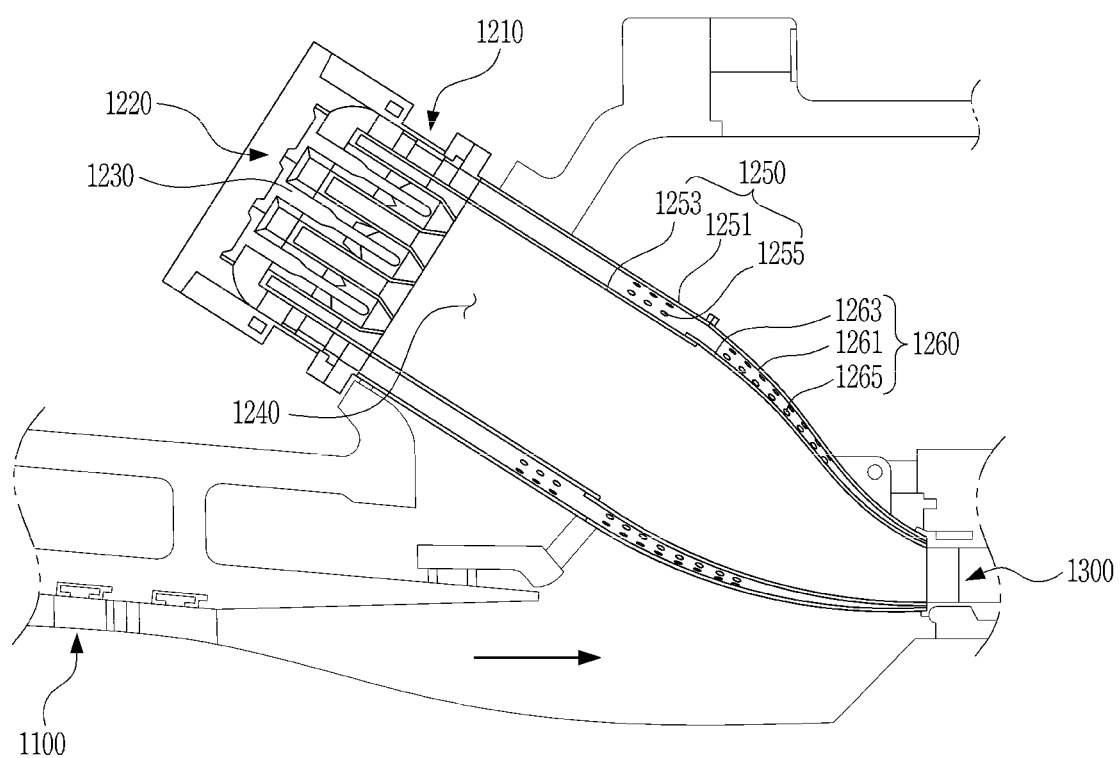
FIG. 2 is a sectional view of a combustor in accordance with the present disclosure.
Figure 3:
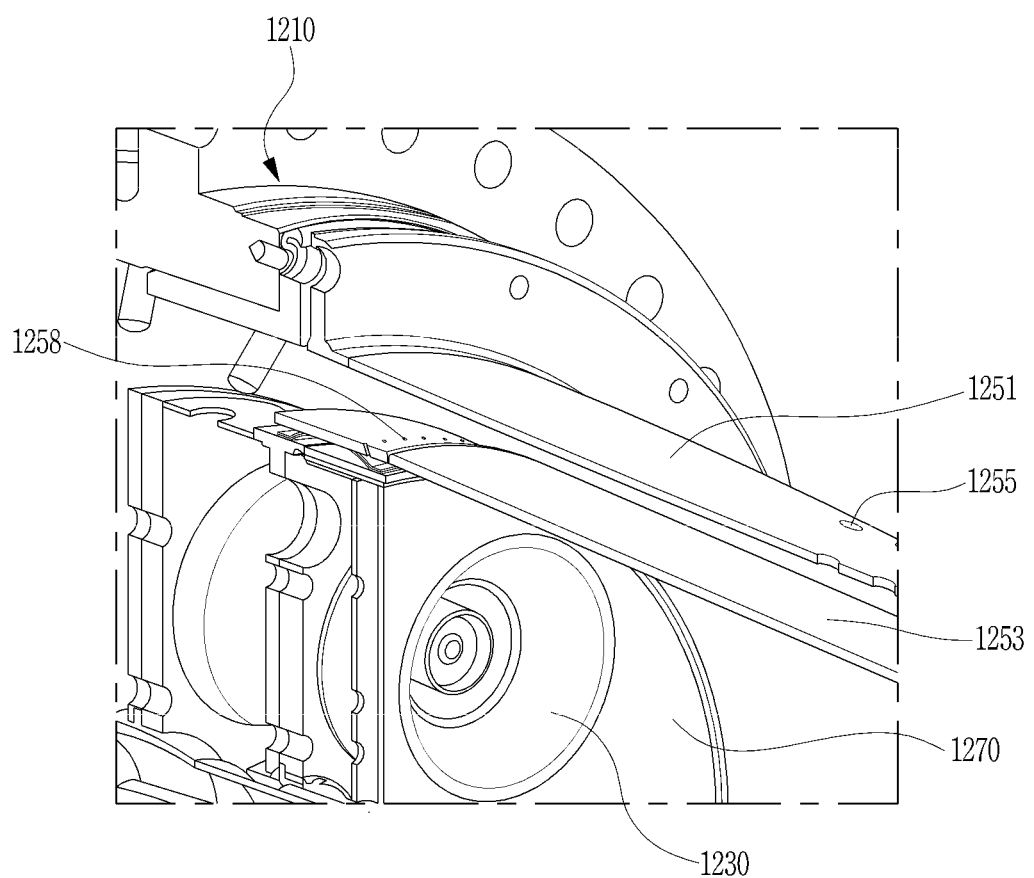
FIG. 3 is a partially exploded perspective view of a portion of the combustor in accordance with the present disclosure.
Figure 4:
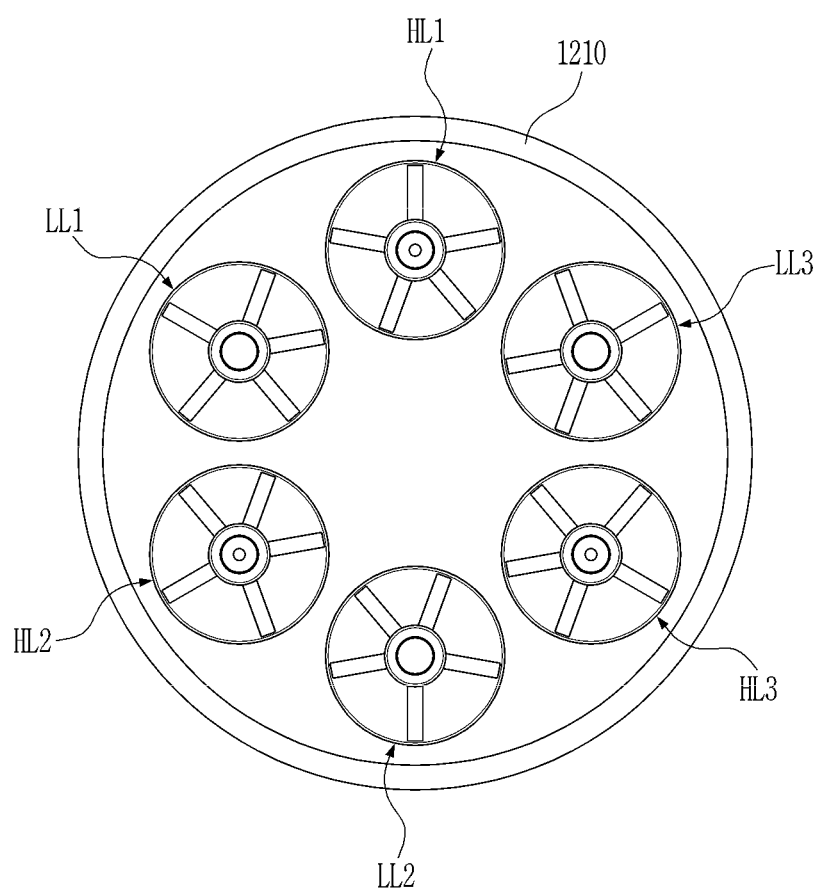
FIG. 4 is a diagram illustrating an arrangement of fuel nozzles in the combustor in accordance with an embodiment of the present disclosure.

FIG. 1 illustrates the structure of a gas turbine 1000 including a combustor in accordance with the present disclosure. FIGS. 2 and 3 illustrate a combustor 1200 in accordance with the present disclosure. FIG. 4 illustrates an arrangement of fuel nozzles in the combustor 1200 in accordance with an embodiment of the present disclosure.

Figure 12:
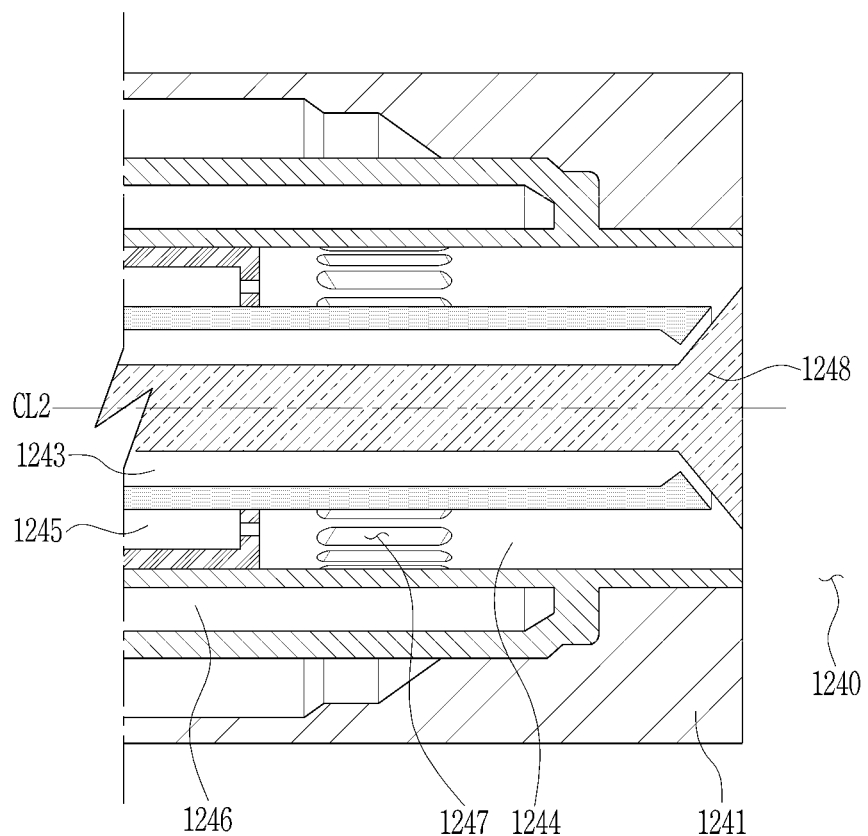
FIG. 12 is an enlarged view of region B of FIG. 11.

Referring to FIGS. 1 to 4, the gas turbine 1000 may include a compressor 1100, a combustor 1200, and a turbine 1300. According to the present embodiment, in the combustor 1200 which mixes compressed air and fuel with each other and combusts the mixture, a plurality of first fuel nozzles HL1 to HL3 and a plurality of second fuel nozzles LL1 to LL3 are disposed in a nozzle casing 1210 and configured to selectively eject gas fuel or liquid fuel. Here, liquid fuel LF is injected into a combustion chamber 1240 from a second fuel injection passage 1233 (refer to FIG. 7) of the first fuel nozzle HL1 capable of ejecting liquid fuel and from a third fuel injection passage 1243 (refer to FIG. 12) of the second fuel nozzle LL1 capable of ejecting liquid fuel. The injected liquid fuel LF may be injected in a diagonal direction with respect to a first center line CL1 and a second center line CL2, in other words, at a predetermined spray angle. Thereby, the liquid fuel LF and compressed air (Air) may be evenly mixed with each other.

The thermodynamic cycle of the gas turbine 1000 according to the present embodiment ideally complies with the Brayton cycle. The Brayton cycle may consist of four processes including an isentropic compression (adiabatic compression) process, an isobaric heat supply process, an isentropic expansion (adiabatic expansion) process, and an isobaric heat rejection process. In other words, the gas turbine may draw air from the atmosphere, compress the air, combust fuel under isobaric conditions to emit energy, expand this high-temperature combustion gas to convert the thermal energy of the combustion gas into kinetic energy, and thereafter discharge exhaust gas with residual energy to the atmosphere. As such, the Brayton cycle may consist of four processes including compression, heat addition, expansion, and heat rejection. Embodying the Brayton cycle, the gas turbine 1000 may include a compressor, a combustor, and a turbine, as shown in FIG. 1. Although the following description will be made with reference to FIG. 1, the description of the present disclosure may also be widely applied to a turbine engine having a configuration equivalent to that of the gas turbine 1000 illustrated in FIG. 1.

Referring to FIG. 1, the compressor 1100 of the gas turbine 1000 may draw air from the outside and compress the air. The compressor 1100 may supply air compressed by compressor blades 1130 to the combustor 1200 and also supply air for cooling to a high-temperature area needed to be cooled in the gas turbine 1000. Here, drawn air is compressed in the compressor 1100 through an adiabatic compression process, so that the pressure and the temperature of air passing through the compressor 1100 are increased.

The compressor 1100 is designed in the form of a centrifugal compressor or an axial compressor. Generally, the centrifugal compressor is used in a small gas turbine. On the other hand, in a large gas turbine such as the gas turbine 1000 shown in FIG. 1, a multi-stage axial compressor 1100 is generally used so as to compress a large amount of air. Here, in the multi-stage axial compressor 1100, the blades 1130 of the compressor 1100 rotate along with rotation of a rotor disk, compress drawn air, and transfer compressed air to vanes 1140 disposed at a following stage. Air is compressed gradually to high pressures while passing through the blades 1130 formed in a multi-stage structure.

The vanes 1140 may be mounted to an inner surface of the housing 1150 in such a way that a plurality of vanes 1140 form each stage. The vanes 1140 guide compressed air transferred from the compressor blades 1130 disposed at the preceding stage, toward the compressor blades 1130 disposed at the following stage. In the present embodiment, at least some of the plurality of vanes 1140 may be mounted to be rotatable within a predetermined range, e.g., to adjust the flow rate of air.

The compressor 1100 may be operated using some of the power output from the turbine 1300. To this end, as shown in FIG. 1, a rotating shaft of the compressor 1100 may be directly coupled with a rotating shaft of the turbine 1300. In the case of the large gas turbine 1000, almost half of the output produced by the turbine 1300 may be consumed to drive the compressor 1100. Therefore, improvement in efficiency of the compressor 1100 will have a direct effect on increasing the overall efficiency of the gas turbine 1000.

The combustor 1200 may mix fuel with compressed air supplied from an outlet of the compressor 1100 and combust the mixture through an isobaric combustion process to make combustion gas having high energy. FIG. 2 illustrates an example of the combustor 1200 applied to the gas turbine 1000. The combustor 1200 is disposed at a downstream side of the compressor 1100.

Referring to FIG. 2, the combustor 1200 in accordance with the present embodiment may include a burner 1220, a liner 1250, and a transition piece 1260. Here, the liner 1250 and the transition piece 1260 which are coupled in series to each other form a combustion chamber in the combustor 1200. The burner 1220 and the combustion chamber which are coupled to each other form a combustion can in the combustor 1200. In other words, the combustor 1200 as shown in FIG. 1, in which a plurality of combustors are arranged around the gas turbine 1000, may be formed of a plurality of combustion cans.

The plurality of burners 1220 may be disposed along nozzle casings 1210 arranged in an annular shape. In detail, the plurality burners 1220 may be respectively disposed in a plurality of nozzles casings 1210 disposed along an annular imaginary line at positions spaced apart from each other. A plurality of combustion nozzles 1230 are provided in each burner 1220. Fuel ejected from the combustion nozzles 1230 is mixed with air at an appropriate ratio to form a mixture having conditions suitable for combustion.

In the gas turbine 1000, gas fuel, liquid fuel, or hybrid fuel formed by a combination of them may be used. It is important to form combustion conditions suitable for reducing the amount of exhaust gas such as carbon monoxide and nitrogen oxide, which should be regulated by law. Recently, use of a pre-mixed combustion scheme has increased because a combustion temperature can be reduced and uniform combustion is possible so that exhaust gas can be reduced, although it is difficult to control the pre-combustion.

In the gas turbine 1000 according to the present embodiment, the pre-mixed combustion scheme is employed, so that compressed air is mixed with fuel ejected in advance from the combustion nozzles 1230, and then enters the combustion chamber 1240.

Referring to FIGS. 3 and 4, the plurality of combustion nozzles 1230 are disposed in each nozzle casing 1210. The plurality of combustion nozzles 1230 may include the plurality of first fuel nozzles HL1 to HL3 and the plurality of second fuel nozzles LL1 to LL3 which have different structures. In other words, the plurality of first fuel nozzles HL1 to HL3 and the plurality of second fuel nozzles LL1 to LL3 may be disposed in the nozzle casing 1210.

According to the present embodiment, the plurality of first fuel nozzles HL1 to HL3 and the plurality of second fuel nozzles LL1 to LL3 may selectively eject gas fuel or liquid fuel. In more detail, the plurality of first fuel nozzles HL1 to HL3 and the plurality of second fuel nozzles LL1 to LL3 may eject gas fuel or liquid fuel based on a driving mode. For example, in the case where the gas turbine 1000 is driven using gas fuel, the plurality of first fuel nozzles HL1 to HL3 and the plurality of second fuel nozzles LL1 to LL3 may eject gas fuel. Alternatively, in the case where the gas turbine 1000 is driven using liquid fuel, the plurality of first fuel nozzles HL1 to HL3 and the plurality of second fuel nozzles LL1 to LL3 may eject liquid fuel.

Figure 5:
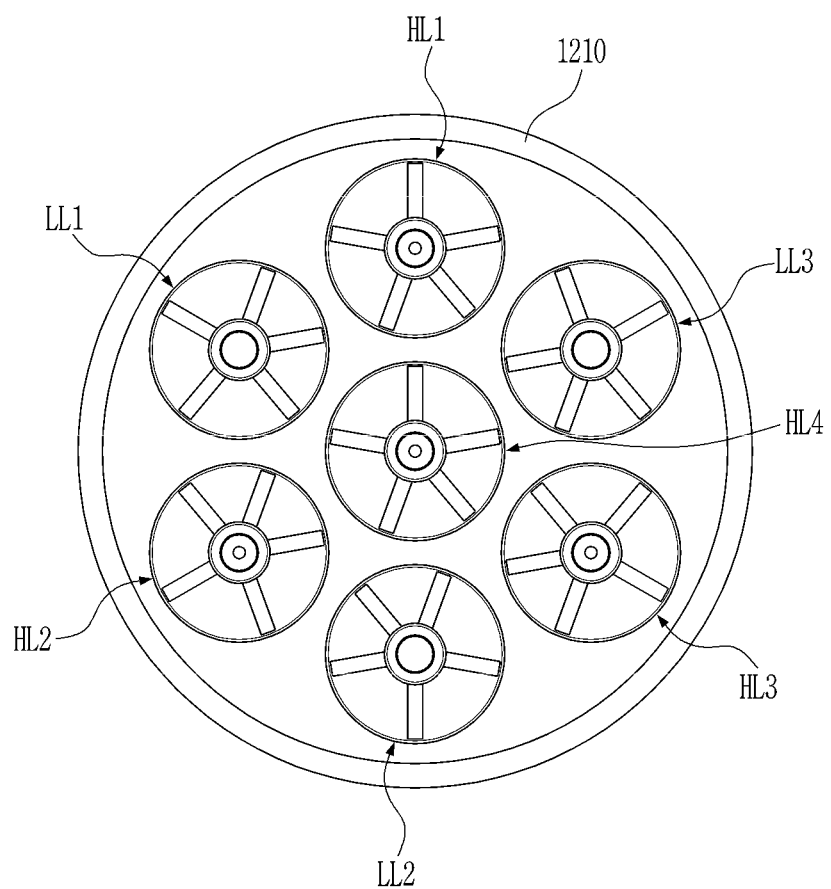
FIG. 5 illustrates a modification of the arrangement of the fuel nozzles of FIG. 4.

As shown in FIG. 4, the plurality of first fuel nozzles HL1 to HL3 may be disposed at positions spaced apart from each other along an annular imaginary line (not shown) in the nozzle casing 1210. Each of the plurality of second fuel nozzles LL1 to LL3 may be disposed between a pair of adjacent first fuel nozzles HL1 to HL3. In other words, the first fuel nozzle HL1, the second fuel nozzle LL1, the first fuel nozzle HL2, the second fuel nozzle LL2, the first fuel nozzle HL3, the second fuel nozzle LL3 may be disposed in sequence along the annular imaginary line. However, the arrangement of the plurality of first fuel nozzles HL1 to HL3 and the plurality of second fuel nozzles LL1 to LL3 is not limited to the structure shown in FIG. 4. For example, as illustrated in FIG. 5 showing a modification of the structure of FIG. 4, an additional first fuel nozzle HL4 may be disposed among the plurality of first fuel nozzles HL1 to HL3 and the plurality of second fuel nozzles LL1 to LL3 which are arranged in an annular configuration.

Hereinafter, the structure of each of the first fuel nozzle HL1 and the second fuel nozzle LL1 in accordance with the present embodiment will be described in detail with reference to FIGS. 6 to 14.

Figure 6:
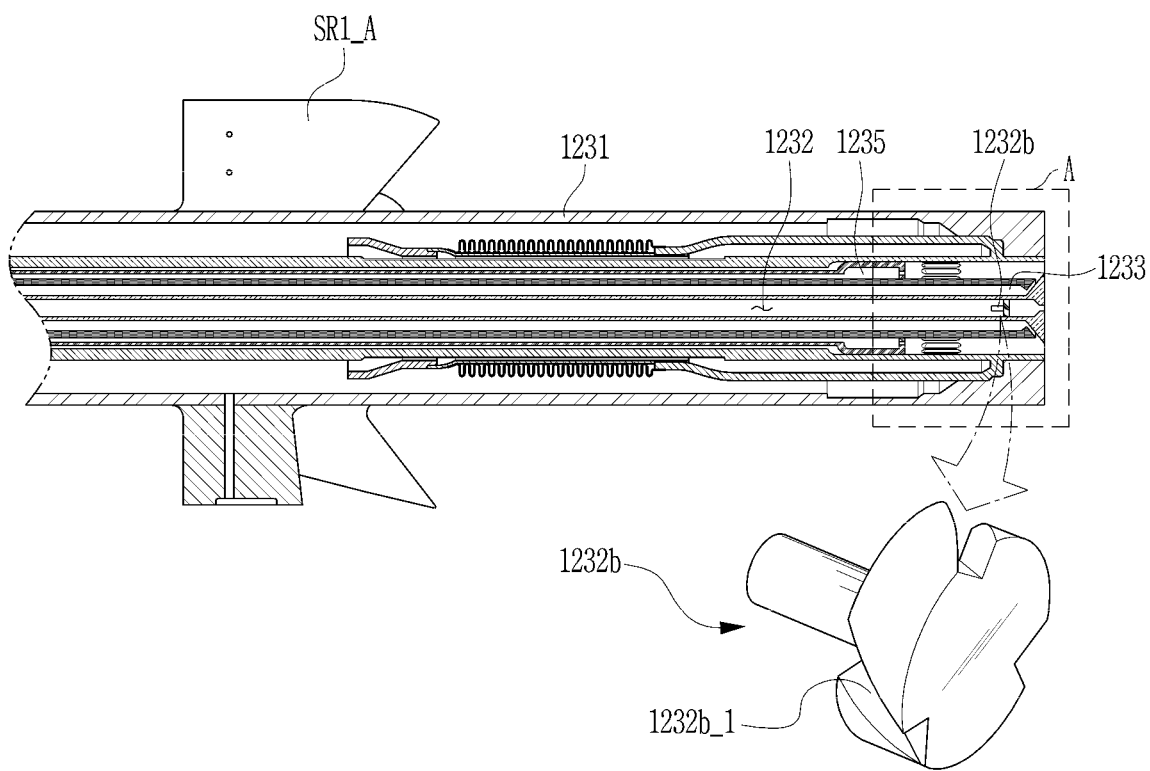
FIG. 6 is a sectional view of a portion of a first fuel nozzle of FIG. 4.
Figure 7:
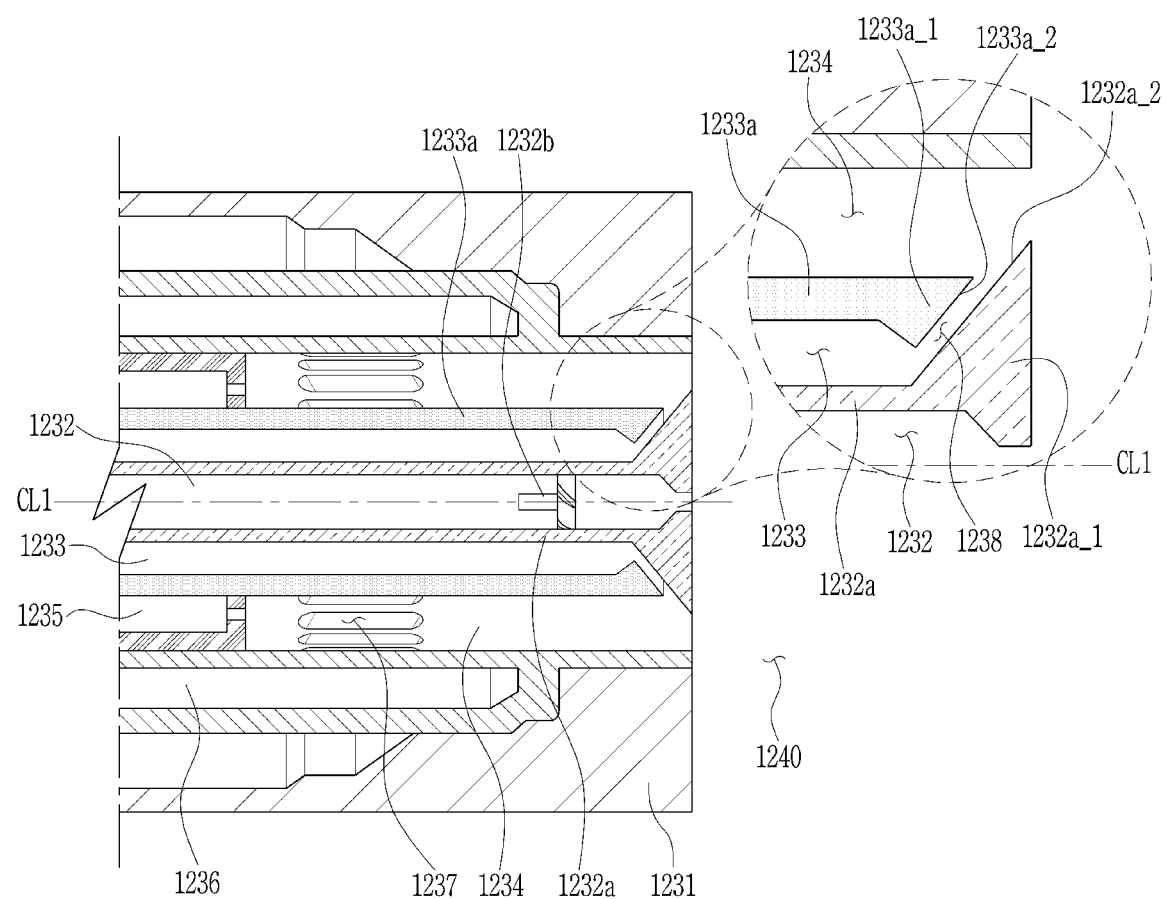
FIG. 7 is an enlarged view of region A of FIG. 6.
Figure 8:
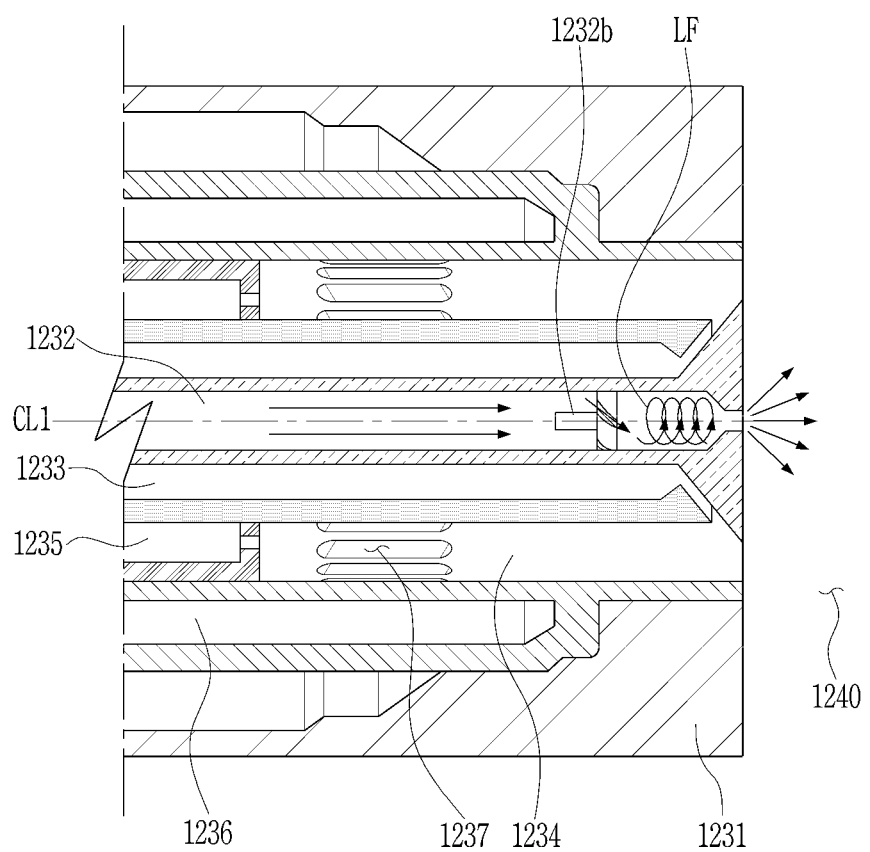
FIGS. 8 to 10 are diagrams illustrating a process of ejecting liquid fuel from the first fuel nozzle in accordance with the present disclosure.
Figure 9:
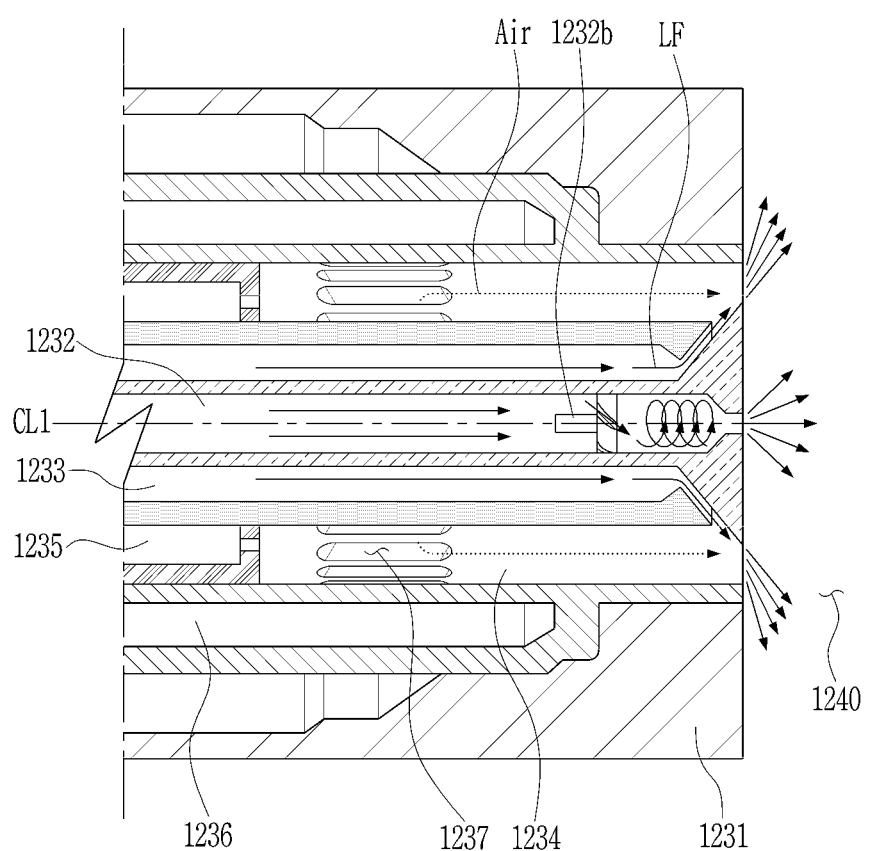
Figure 10:
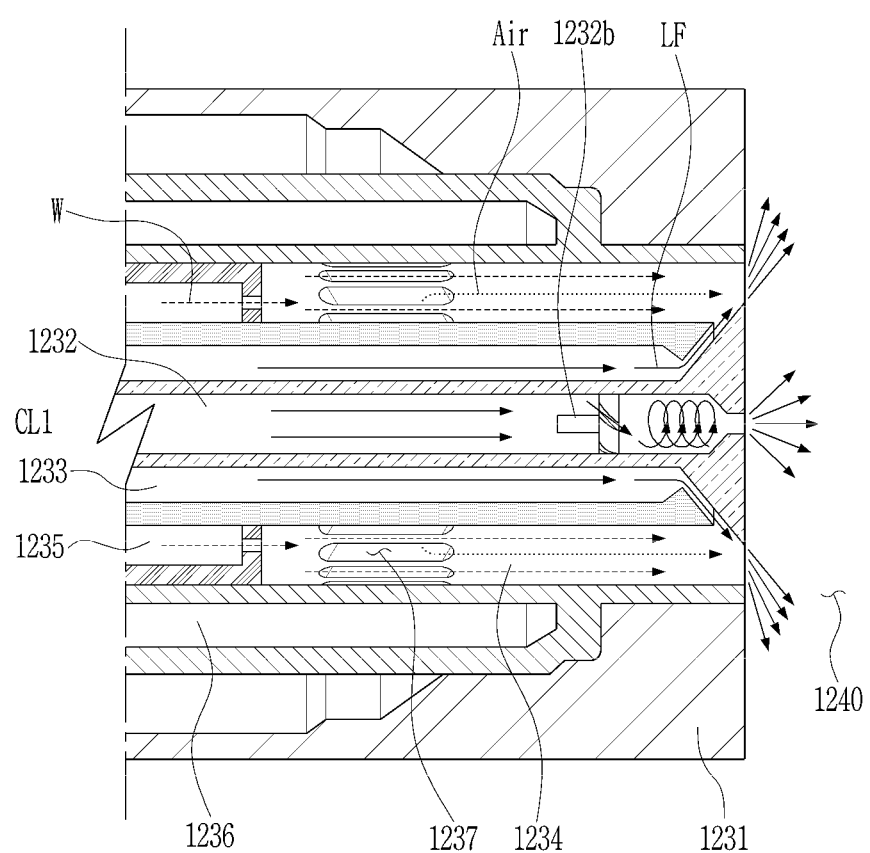
Figure 11:
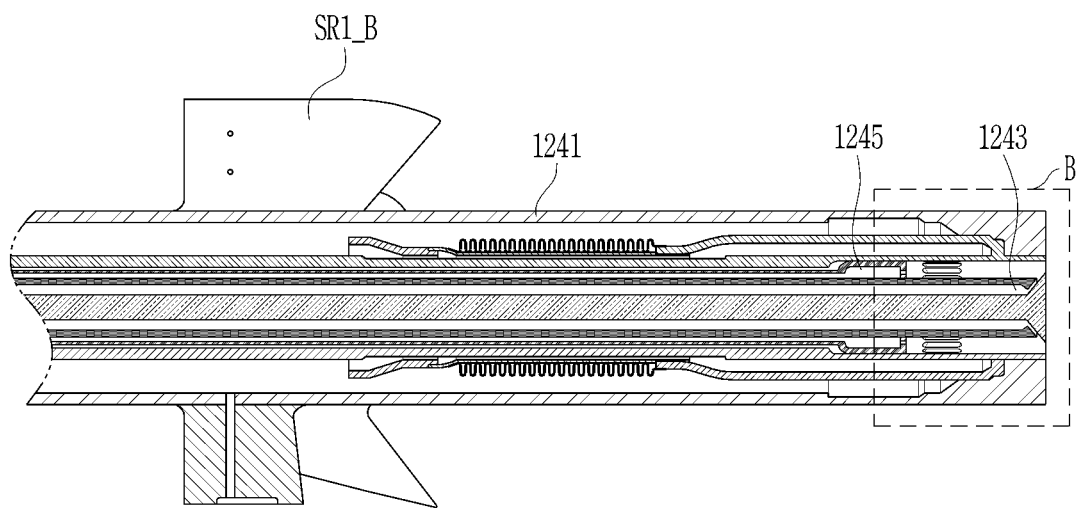
FIG. 11 is a sectional view of a portion of a second fuel nozzle of FIG. 4.
Figure 13:
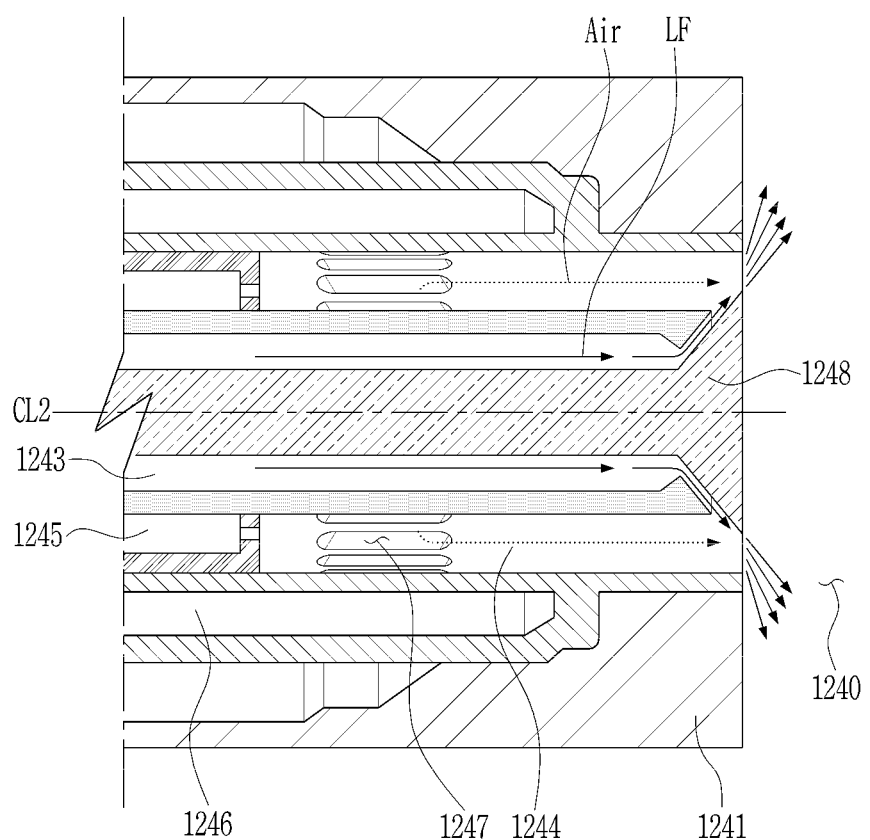
FIGS. 13 and 14 are diagrams illustrating a process of ejecting liquid fuel from the second fuel nozzle in accordance with the present disclosure.
Figure 14:
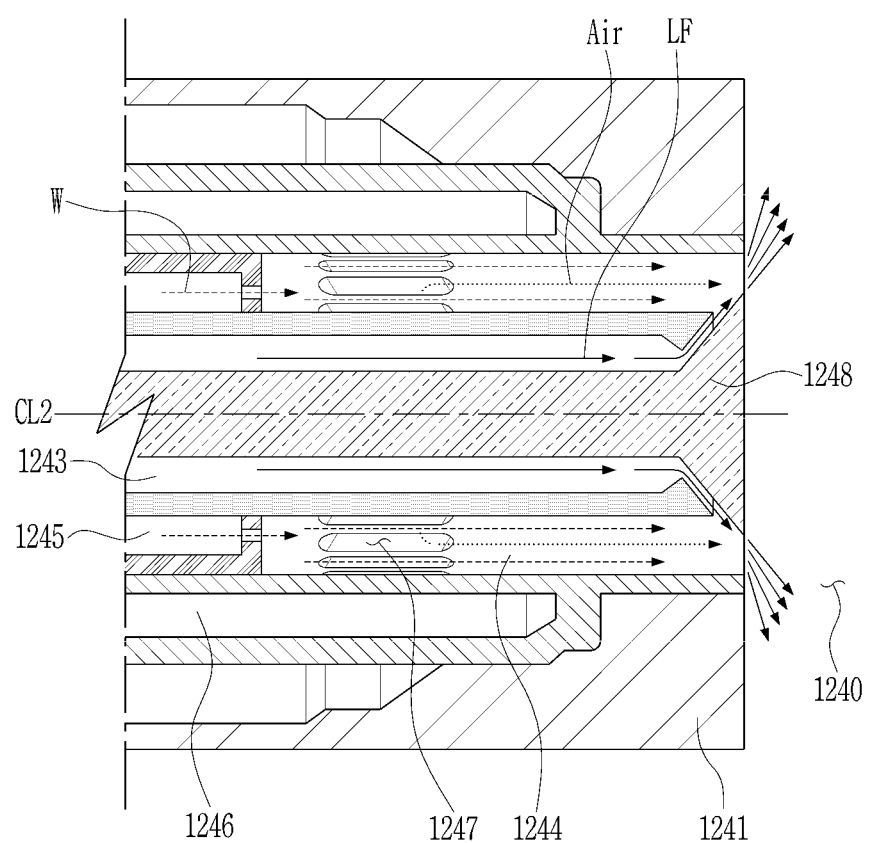

FIG. 6 illustrates a portion of the first fuel nozzle HL1 of FIG. 4, and FIG. 7 details a region A of FIG. 6. FIGS. 8 to 10 illustrate a process of ejecting liquid fuel from the first fuel nozzle. FIG. 11 illustrates a portion of the second fuel nozzle LL1 of FIG. 4, and FIG. 12 details a region B of FIG. 11. FIGS. 13 and 14 illustrate a process of ejecting liquid fuel from the second fuel nozzle.

Referring to FIGS. 6 and 7, the first fuel nozzle HL1 may include a first nozzle body 1231, a first fuel injection passage 1232, a second fuel injection passage 1233, a first air injection passage 1234, a first water supply passage 1235, and a first swirler SR1_A. As described above, the first fuel nozzle HL1 may selectively eject gas fuel or liquid fuel based on the driving mode. In the present embodiment, unlike the second fuel nozzle LL1 (refer to FIGS. 11 and 12), the first fuel nozzle HL1 may be configured in such a way that the first fuel injection passage 1232 for ejecting liquid fuel to be used for ignition is disposed in a central portion of the first nozzle body 1231. The first fuel nozzle HL1 shown in FIGS. 6 and 7 may be one of the plurality of first fuel nozzles HL1 to HL3 of FIG. 4 and have the same structure as that of the other first fuel nozzles HL2 and HL3; therefore, detailed description of the first fuel nozzles HL2 and HL3 will be omitted.

The first fuel injection passage 1232 may be used when the gas turbine is driven using liquid fuel. In detail, the first fuel injection passage 1232 may be used from an initial ignition time in a liquid fuel driving mode. The first fuel injection passage 1232 may supply liquid fuel LF from the initial ignition time and continuously eject liquid fuel LF even after the ignition has been successfully performed.

The first fuel injection passage 1232 may be formed in a central portion of the first nozzle body 1231 of the first fuel nozzle HL1 and configured to inject liquid fuel LF (refer to FIG. 8) into the combustion chamber 1240. The first fuel injection passage 1232 may be a space formed in a first tubular member 1232a and may extend along the first center line CL1 drawn through the axial center of the first fuel nozzle HL1. An injection hole for ejecting liquid fuel LF (refer to FIG. 8) may be formed in a first end 1232a_1 of the first fuel injection passage 1232 that is adjacent to the combustion chamber 1240. Liquid fuel LF (refer to FIG. 8) may be injected from the first fuel injection passage 1232 into the combustion chamber 1240 through the injection hole of the first end 1232a_1. Here, a swirling member 1232b may be disposed in the first fuel injection passage 1232 at a position adjacent to the injection hole. A plurality of swirling passages 1232b_1 are formed in the swirling member 1232b. Liquid fuel LF (refer to FIG. 8) flowing along the first fuel injection passage 1232 may be swirled by the plurality of swirling passages 1232b_1. In other words, liquid fuel LF (refer to FIG. 8) flowing in the first fuel injection passage 1232 forms a swirling flow while passing through the spiral member 1232b. Liquid fuel LF that has passed through the swirling member 1232b may be injected at a predetermined spray angle into the combustion chamber 1240 through the injection hole formed in the first end 1232a_1 of the first fuel injection passage 1232.

If ignition is completed by the liquid fuel LF (refer to FIG. 8) injected from the first fuel injection passage 1232, the second fuel injection passage 1233 may eject liquid fuel LF (refer to FIG. 9). In other words, in the case where the gas turbine is ignited and normally driven, the second fuel injection passage 1233 may eject fuel liquid LF (refer to FIG. 9).

The second fuel injection passage 1233, which may be a space formed in a second tubular member 1233a, encloses the first fuel injection passage 1232. The second fuel injection passage 1233 may extend along the first center line CL1 parallel to the first fuel injection passage 1232.

According to the present embodiment, the second fuel injection passage 1233 may inject liquid fuel LF (refer to FIG. 9) into the combustion chamber 1240 at a predetermined spray angle with respect to the first center line CL1. Here, the first end 1232a_1 of the first fuel injection passage 1232 may have an outer circumferential surface 1232a_2 inclined at the predetermined angle with respect to the first center line CL1. For example, the outer circumferential surface 1232a_2 of the first end 1232a_1 of the first fuel injection passage 1232 may have roughly a truncated conical shape.

A second end 1233a_1 of the second fuel injection passage 1233 may have an inner circumferential surface 1233a _2 which faces the outer circumferential surface 1232a_2 of the first end 1232a_1 of the first fuel injection passage 1232. The inner circumferential surface 1233a_2 of the second end 1233a_1 may have a shape corresponding to that of the outer circumferential surface 1232a_2 of the first end 1232a_1. The inner circumferential surface 1233a_2 of the second end 1233a_1 may be inclined at a predetermined angle with respect to the first center line CL1 in the same manner as that of the outer circumferential surface 1232a_2 of the first end 1232a_1. For example, the inner circumferential surface 1233a_2 of the second end 1233a_1 may also have roughly a truncated conical shape.

A space 1238 may be formed between the outer circumferential surface 1232a 2 of the first end 1232a 1 and the inner circumferential surface 1233a 2 of the second end 1233a_1 that face each other as opposing surfaces. As liquid fuel LF (refer to FIG. 9) of the second fuel injection passage 1233 flows along the space 1238, the liquid fuel LF may be ejected at a predetermined spray angle with respect to the first center line CL1, as shown in FIG. 9.

Referring to FIG. 9, the first air injection passage 1234 for ejecting compressed air (Air) to be mixed with liquid fuel LF may be disposed around the second fuel injection passage 1233. The first air injection passage 1234 may extend along the first center line CL1 parallel to the second fuel injection passage 1233.

Compressed air (Air) supplied through the first air supply passage 1236 may be drawn into the first air injection passage 1234 through the first through-hole 1237. The drawn compressed air (Air) moves along the first center line CL1, passes through the space 1238 formed between the first end 1232a_1 (refer to FIG. 7) of the first injection passage 1232 and the second end 1233a_1 (refer to FIG. 7) of the second fuel injection passage 1233, and then is mixed with liquid fuel LF ejected at the predetermined spray angle. Here, the high-pressure compressed air (Air) may collide with the liquid fuel LF, which is being ejected at the predetermined spray angle, and thus promote an atomization process of dividing the liquid fuel LF into small liquid droplets.

In addition, the high-pressure compressed air (Air) may provide a heat shield function to the nozzle end, which is exposed to high temperature. Hence, liquid fuel LF that is present in the nozzle end when liquid fuel LF is not drawn may be prevented from being thermally damaged, whereby a coking phenomenon in which an orifice of the nozzle is clogged by carbonization of the liquid fuel LF may be prevented.

Due to liquid fuel LF ejected at the predetermined spray angle, the mixture of the liquid fuel LF and the compressed air (Air) may also be injected into the combustion chamber 1240 at the predetermined spray angle. Consequently, according to the present embodiment, in the case where the gas turbine is normally driven after the ignition has been successfully performed, liquid fuel LF and compressed air (Air) which are ejected through the first fuel nozzle may be evenly mixed with each other and then injected into the combustion chamber 1240.

Referring to FIG. 10, a first water supply passage 1235 is formed in the first nozzle body 1231 so that water W may be supplied to the first air injection passage 1234. The first water supply passage 1235 may be disposed around the second fuel injection passage 1233 in a direction parallel to the first air injection passage 1234. The first water supply passage 1235 may communicate with the first air injection passage 1234, and may eject water W toward compressed air (Air) to be injected into the combustion chamber 1240. In other words, liquid fuel LF injected into the combustion chamber 1240 may be mixed, in the combustion chamber 1240, with water W ejected from a separate passage. As such, since water W is mixed with liquid fuel LF at a predetermined ratio in the combustion chamber 1240, the temperature in the combustion chamber 1240 is reduced, whereby the amount of nitride oxide, etc., which is generated during combustion, may be reduced.

Referring again to FIG. 6, in the first fuel nozzle HL1 according to the present embodiment, a plurality of first swirlers SR1_A may be disposed around the first nozzle body 1231 at positions spaced apart from each other. The plurality of first swirlers SR1_A may supply gas fuel (not shown) to a peripheral area of the first nozzle body 1231 through injection holes formed in the first swirlers SR1_A. Here, compressed air (not shown) flowing across the plurality of first swirlers SR1_A may be mixed with the gas fuel (not shown).

As described above, only when the gas turbine is driven using gas fuel during a normal driving process can the plurality of first swirlers SR1_A eject gas fuel. In other words, only when the first fuel injection passage 1232 or the second fuel injection passage 1233 does not supply liquid fuel can the plurality of first swirlers SR1_A supply gas fuel. Therefore, in the case where the gas turbine is driven using liquid fuel during the normal driving process, the plurality of first swirlers SR1_A do not supply gas fuel. Likewise, in the case where the plurality of first swirlers SR1_A supply gas fuel during the normal driving operation, the first fuel injection passage 1232 or the second fuel injection passage 1233 does not eject liquid fuel.

However, if an abnormal driving process is unavoidable while the gas turbine is driven using gas fuel or liquid fuel, there may be a need for the kind of fuel for use to be transited from gas fuel to liquid fuel or from liquid fuel to gas fuel while the gas turbine is driven. Here, the case where the abnormal driving process occurs may be, for example, the case where there is a malfunction in a supply system for gas fuel or liquid fuel, or there is a shortage in the amount of stored residual gas fuel or liquid fuel. For instance, during a fuel transition driving process in which the kind of fuel for use is transited from gas fuel to liquid fuel, there is a need for a process of gradually increasing a supply rate of liquid fuel while reducing a supply rate of gas rate. During this process, an event in which gas fuel and liquid fuel are momentarily simultaneously supplied may be caused. Even when the driving mode is transited from liquid fuel to gas fuel, the same event as above may be caused.

Referring to FIGS. 11 to 14, the second fuel nozzle LL1 may include a second nozzle body 1241, a third fuel injection passage 1243, a second air injection passage 1244, a second water supply passage 1245, and a second swirler SR1_B. As described above, the second fuel nozzle LL1 may selectively eject gas fuel or liquid fuel based on the driving mode. In the present embodiment, unlike the first fuel nozzle HL1 (refer to FIGS. 6 and 7), the second fuel nozzle LL1 may be configured in such a way that the first fuel injection passage 1232 (refer to FIGS. 6 and 7) for ejecting liquid fuel to be used for ignition is not disposed in a central portion of the second nozzle body 1241. Therefore, only when the gas turbine is normally driven after the ignition has been completed can the second fuel nozzle LL1 eject liquid fuel LF. The second fuel nozzle LL1 shown in FIGS. 11 to 14 may be one of the plurality of second fuel nozzles LL1 to LL3 of FIG. 4 and have the same structure as that of the other second fuel nozzles LL2 and LL3; therefore, description of the second fuel nozzles HL2 and HL3 will be omitted.

If the ignition using liquid fuel LF (refer to FIG. 8) ejected from the first fuel injection passage 1232 (refer to FIGS. 6 and 7) of the first fuel nozzle HL1 (refer to FIGS. 6 and 7) has been completed, not only the first fuel injection passage 1232 (refer to FIGS. 6 and 7) and the second fuel injection passage 1233 (refer to FIGS. 6 and 7) but also the third fuel injection passage 1243 of the second fuel nozzle LL1 can eject liquid fuel LF. If the driving load of the engine is required to be increased to a predetermined level or more and an increase in supply rate of liquid fuel LF is thus needed, the third fuel injection passage 1243 of the second fuel nozzle LL1 additionally ejects liquid fuel LF while the injection of the first fuel nozzle HL1 is maintained.

Here, the third fuel injection passage 1243 may enclose a central shaft 1248 and extend along center line CL2. The third fuel injection passage 1243 may inject liquid fuel LF into the combustion chamber 1240 at a predetermined spray angle with respect to the second center line CL2. A third end of the central shaft 1248 may have an outer circumferential surface inclined at a predetermined angle with respect to the second center line CL2. For example, the third end of the central shaft 1248 may have a truncated conical shape. The third end of the central shaft 1248 shown in FIGS. 12 to 14 has the same shape as that of the first end 1232a_1 of the first fuel injection passage 1232 of FIG. 7; therefore, a reference numeral thereof will be omitted.

Furthermore, a fourth end of the third fuel injection passage 1243 may have an inner circumferential surface facing the outer circumferential surface of the third end of the central shaft 1248. The inner circumferential surface of the fourth end may have a shape corresponding to that of the outer circumferential surface of the third end. The inner circumferential surface of the fourth end may be inclined at a predetermined angle with respect to the second center line in the same manner as that of the outer circumferential surface of the third end. For example, the inner circumferential surface of the fourth end may have a truncated conical shape. Here, the fourth end of the third fuel injection passage 1243 shown in FIGS. 12 to 14 has the same shape as that of the second end 1233a_1 of the second fuel injection passage 1233 of FIG. 7; therefore, a reference numeral thereof will be omitted.

A space may be formed between the outer circumferential surface of the third end and the inner circumferential surface of the fourth end that face each other, in the same manner that of the first end 1232a_1 and the second end 1233a_1 of FIG. 7. Since liquid fuel LF of the third fuel injection passage 1243 moves through the space, the liquid fuel LF may be ejected at the predetermined spray angle with respect to the second center line CL2.

The second air injection passage 1244 for ejecting compressed air (Air) to be mixed with liquid fuel LF may be disposed around the third fuel injection passage 1243. The second air injection passage 1244 may extend along the second center line CL2 parallel to the third fuel injection passage 1243.

Compressed air (Air) supplied through the second air supply passage 1246 may be drawn into the second air injection passage 1244 through the second through-hole 1247. The drawn compressed air (Air) moves along the second center line CL2, and then is mixed with liquid fuel LF ejected at the predetermined spray angle through the space between the third end of the central shaft 1248 and the fourth end of the third fuel injection passage 1243. Here, high-pressure compressed air (Air) may collide with liquid fuel LF, which is being ejected at the predetermined spray angle, and thus promote an atomization process of dividing the liquid fuel LF into small liquid droplets.

In addition, the high-pressure compressed air (Air) may provide a heat shield function to the nozzle end, which is exposed to high temperature. Hence, liquid fuel LF that is present in the nozzle end when liquid fuel LF is not drawn may be prevented from being thermally damaged, whereby a coking phenomenon in which an orifice of the nozzle is clogged by carbonization of the liquid fuel LF may be prevented.

Due to liquid fuel LF ejected at the predetermined spray angle, the mixture of the liquid fuel LF and the compressed air (Air) may also be injected into the combustion chamber 1240 at the predetermined spray angle. Consequently, according to the present embodiment, in the case where the gas turbine is ignited and normally driven, liquid fuel LF and compressed air (Air) which are ejected through the second fuel nozzle may be evenly mixed with each other and then injected into the combustion chamber 1240.

Referring to FIG. 14, a second water supply passage 1245 is formed in the second nozzle body 1241 so that water W may be supplied to the second air injection passage 1244. The second water supply passage 1245 may be disposed around the third fuel injection passage 1243 in a direction parallel to the second air injection passage 1244. The second water supply passage 1245 may communicate with the second air injection passage 1244, and may eject water W toward compressed air (Air) to be injected into the combustion chamber 1244. In other words, liquid fuel LF injected into the combustion chamber 1240 may be mixed, in the combustion chamber 1240, with water W ejected from a separate passage. As such, since water W is mixed with liquid fuel LF at a predetermined ratio in the combustion chamber 1240, the temperature in the combustion chamber 1240 is reduced, whereby the amount of nitride oxide, etc., which is generated during combustion, may be reduced.

Referring again to FIG. 11, in the second fuel nozzle LL1 according to the present embodiment, a plurality of second swirlers SR1_B may be disposed around the second nozzle body 1241 at positions spaced apart from each other. The plurality of second swirlers SR1_B may supply gas fuel (not shown) to a peripheral area of the second nozzle body 1241 through injection holes formed in the second swirlers SR1_B. Here, compressed air (not shown) flowing across the plurality of second swirlers SR1_B may be mixed with the gas fuel (not shown).

As described above, only when the gas turbine is driven using gas fuel can the plurality of second swirlers SR1_B eject gas fuel. In other words, only when the third fuel injection passage does not supply liquid fuel can the plurality of second swirlers SR1_B supply gas fuel. Therefore, in the case where the gas turbine is driven using liquid fuel, the plurality of second swirlers SR1_B do not supply gas fuel. Likewise, in the case where the plurality of second swirlers SR1_B supplies gas fuel, the third fuel injection passage 1243 does not eject liquid fuel.

Referring again to FIG. 2, the plurality of liners 1250 are respectively disposed at downstream sides of the plurality of burners 1220. In the combustion chamber 1240 formed in each of the plurality of liners 1250, fuel and compressed air ejected from the combustion nozzles 1230 of the burner 1220 may be combusted. Here, since the plurality liners 1250 are respectively coupled to the plurality of burners 1220 disposed along an annular imaginary line, the plurality of liners 1250 may also be disposed along the annular imaginary line.

Each of the plurality of liners 1250 may have a double-shell structure including an inner liner 1253 and an outer liner 1251. In other words, each liner 1250 may have a double-shell structure in which the outer liner 1251 encloses the inner liner 1253. Here, the inner liner 1253 is a hollow tubular member, and fuel and compressed air are combusted in an internal space, i.e., the combustion chamber 1240, defined in the inner liner 1253.

The transition piece 1260 is disposed at a downstream side of the liner 1250. The transition piece 1260 may transfer high-pressure gas generated in the liner 1250 to the turbine 1300 at high speeds. The transition piece 1260 may have a double-shell structure including an inner transition piece 1263 and an outer transition piece 1261. In other words, the transition piece 1260 may have a double-shell structure in which the outer transition piece 1261 encloses the inner transition piece 1263. Here, the inner transition piece 1263 is also a hollow tubular member in the same manner as that of the inner liner 1253, but the inner transition piece 1263 may have a shape in which the diameter is gradually reduced from the liner 1250 to the turbine 1300.

The inner liner 1253 and the inner transition piece 1263 may be coupled to each other by a plate spring seal (not shown). Because one end of the inner liner 1253 and one end of the inner transition piece 1263 are respectively fixed to the combustor 1200 and the turbine 1300, the plate spring seal should have a structure capable of absorbing length and diameter extension due to thermal expansion so as to reliably support the inner liner 1253 and the inner transition piece 1263.

Furthermore, there is a need to appropriately cool the combustor 1200 because the combustor 1200 forms the highest temperature environment in the gas turbine 1000. Compressed air flows along outer surfaces of the liner 1250 and the transition piece 1260 through which high-temperature combustion gas flows, and then is supplied toward the combustion nozzles 1230. During this process, the liner 1250 and the transition piece 1260 that have been heated by high-temperature combustion gas may be appropriately cooled.

The gas turbine 1000 in accordance with the present embodiment has a structure in which the outer liner 1251 and the outer transition piece 1261 enclose the inner liner 1253 and the inner transition piece 1263. Compressed air may pass both through an annular space between the inner liner 1253 and the outer liner 1251 and through an annular space between the inner transition piece 1263 and the outer transition piece 1261. Compressed air passing through these annular spaces may cool the inner liner 1253 and the inner transition piece 1263.

A plurality of first cooling holes 1265 may be formed in the outer transition piece 1261 enclosing the inner transition piece 1263. The plurality of first cooling holes 1265 are holes passing through the outer transition piece 1261. Air (hereinafter referred to as "jet flow") passing through the plurality of first cooling holes 1265 may perpendicularly collide with the outer surface of the inner transition piece 1263 and cool the inner transition piece 1263.

A plurality of second cooling holes 1255 may be formed in the outer liner 1251 enclosing the inner liner 1253. The plurality of second cooling holes 1255 are holes passing through the outer liner 1251. In the same manner as the above-mentioned first cooling holes 1265, jet flows passing through the plurality of second cooling holes 1255 may perpendicularly collide with the outer surface of the inner liner 1253 and cool the inner liner 1253.

High-temperature and high-pressure combustion gas generated from the combustor 1200 is supplied to the turbine 1300 through the liner 1250 and the transition piece 1260. In the turbine 1300, combustion gas expands through an adiabatic expansion process and collides with a plurality of turbine blades 1310 radially disposed on the rotating shaft of the turbine 1300 so that reaction force is applied to the turbine blades 1310. Thus, thermal energy of the combustion gas is converted into mechanical energy by which the rotating shaft is rotated. Some of the mechanical energy obtained in the turbine 1300 is supplied as energy needed to compress air in the compressor, and the residual mechanical energy is used as valid energy for driving a generator to produce electric power, or the like.

As described above, in a combustor and a gas turbine in accordance with the present disclosure, liquid fuel injected into a combustion chamber may be divided into small liquid droplets.

Furthermore, a coking phenomenon in which an orifice of a nozzle is clogged by carbonization of liquid fuel may be prevented.

While the present disclosure has been described with respect to the specific embodiments, it will be apparent to those skilled in the art that various changes or modifications of the invention are possible by adding, changing, or deleting components without departing from the spirit and scope of the invention as defined in the following claims. It should be noted that these changes or modifications also fall within the bounds of the invention.

As such, although the present disclosure has been described with respect to the limited embodiments and drawings, the present disclosure is not limited to these. Those skilled in the art may appreciate that various changes and modifications are possible within the scope defined by the technical spirit of the present disclosure and other equivalents to the accompanying claims.

What is claimed is:

1. A combustor comprising a nozzle casing and a plurality of first fuel nozzles disposed in the nozzle casing and spaced apart from each other along an annular imaginary line, each first fuel nozzle having an axial center at which a first center line is drawn and comprising:
   a first fuel injection passage disposed at the axial center of the first fuel nozzle and configured to inject liquid fuel into a combustion chamber;
   a second fuel injection passage enclosing the first fuel injection passage, and configured to inject liquid fuel into the combustion chamber at a first predetermined spray angle with respect to the first center line;
   a first air injection passage enclosing the second fuel injection passage, and configured to inject air to be mixed with the injected liquid fuel from the second fuel injection passage, the first air injection passage receiving the air from a first air supply passage surrounding the first air injection passage via at least one through-hole formed along the first air injection passage; and
   a first water supply passage communicating with the first air injection passage and configured to inject water into the first air injection passage at a location upstream of the at least one through-hole, the water and the air being mixed with each other in the first air injection passage and injected from the first air injection passage,
   wherein the second fuel injection passage is enclosed by the first water supply passage and the first air injection passage, and
   wherein the first water supply passage is disposed around the second fuel injection passage in a direction parallel to the first air injection passage, and supplies water to a combustion chamber of the combustor through the first air injection passage to mix the liquid fuel and water in the combustion chamber.

2. The combustor according to claim 1,
   wherein the first fuel injection passage includes a first end disposed adjacent to the combustion chamber, the first end having an outer circumferential surface inclined at a first predetermined angle with respect to the first center line, and
   wherein the second fuel injection passage includes a second end disposed adjacent to the combustion chamber, the second end having an inner circumferential surface inclined at the first predetermined angle with respect to the first center line.

3. The combustor according to claim 2, wherein the outer circumferential surface of the first end and the inner circumferential surface of the second end are opposing surfaces separated by a space through which the liquid fuel of the second fuel injection passage is injected into the combustion chamber.

4. The combustor according to claim 2, wherein the outer circumferential surface of the first end has a truncated conical shape.

5. The combustor according to claim 4, wherein the inner circumferential surface of the second end has a shape corresponding to the outer circumferential surface of the first end.

6. The combustor according to claim 5, wherein the inner circumferential surface of the second end has a truncated conical shape.

7. The combustor according to claim 1, wherein the liquid fuel is injected into the combustion chamber from either one of the first fuel injection passage and the second fuel injection passage.

8. The combustor according to claim 1, wherein each first fuel nozzle further comprises a plurality of first swirlers disposed at positions spaced apart from each other along a circumference of the first air injection passage.

9. The combustor according to claim 1, further comprising a plurality of second fuel nozzles disposed along the annular imaginary line, each second fuel nozzle being disposed between a pair of adjacent first fuel nozzles of the plurality of first fuel nozzles and having an axial center at which a second center line is drawn.

10. The combustor according to claim 9, wherein each of the plurality of second fuel nozzles comprises:
a central shaft disposed at the axial center of the second fuel nozzle;
a third fuel injection passage enclosing the central shaft, and configured to inject liquid fuel into the combustion chamber at a second predetermined spray angle with respect to the second center line; and
a second air injection passage enclosing the third fuel injection passage, and configured to inject air to be mixed with the injected liquid fuel from the third fuel injection passage.

11. The combustor according to claim 10,
wherein the central shaft includes a third end disposed adjacent to the combustion chamber, the third end having an outer circumferential surface inclined at a second predetermined angle with respect to the second center line, and
wherein the third fuel injection passage includes a fourth end disposed adjacent to the combustion chamber, the fourth end having an inner circumferential surface inclined at the predetermined angle with respect to the second center line.

12. The combustor according to claim 11, wherein the outer circumferential surface of the third end and the inner circumferential surface of the fourth end are opposing surfaces separated by a space through which the liquid fuel of the third fuel injection passage is injected into the combustion chamber.

13. The combustor according to claim 12, wherein the inner circumferential surface of the fourth end has a shape corresponding to the outer circumferential surface of the third end.

14. The combustor according to claim 13, wherein each of the outer circumferential surface of the third end and the inner circumferential surf ace of the fourth end has a truncated conical shape.

15. The combustor according to claim 10, further comprising a second water supply passage communicating with the second air injection passage and configured to supply water to the second air injection passage, the water and the air being mixed with each other in the second air injection passage and injected from the second air injection passage.

16. The combustor according to claim 10, wherein each second fuel nozzle further comprises a plurality of second swirlers disposed at positions spaced apart from each other along a circumference of the second air injection passage.

17. A gas turbine comprising a compressor to compress air drawn from outside of the gas turbine, a combustor to produce combustion gas by mixing fuel with the compressed air and combusting a mixture of the fuel and the compressed air, and a turbine configured to be rotated by the combustion gas, the combustor comprising:
a nozzle casing; and
a plurality of first fuel nozzles disposed in the nozzle casing and spaced apart from each other along an annular imaginary line, each first fuel nozzle having an axial center at which a first center line is drawn and comprising:
a first fuel injection passage disposed at the axial center of the first fuel nozzle and configured to inject liquid fuel into a combustion chamber;
a second fuel injection passage enclosing the first fuel injection passage, and configured to inject liquid fuel into the combustion chamber at a predetermined spray angle with respect to the first center line;
a first air injection passage enclosing the second fuel injection passage, and configured to inject air to be mixed with the injected liquid fuel from the second fuel injection passage, the first air injection passage receiving the air from a first air supply passage surrounding the first air injection passage via at least one through-hole formed along the first air injection passage; and
a first water supply passage communicating with the first air injection passage and configured to inject water into the first air injection passage at a location upstream of the at least one through-hole, the water and the air being mixed with each other in the first air injection passage and injected from the first air injection passage,
wherein the second fuel injection passage is enclosed by the first water supply passage and the first air injection passage, and
wherein the first water supply passage is disposed around the second fuel injection passage in a direction parallel to the first air injection passage, and supplies water to a combustion chamber of the combustor through the first air injection passage to mix the liquid fuel and water in the combustion chamber.

\* \* \* \* \*